April 26, 1932.  P. G. LEONARD  1,856,029
LUBRICATING SYSTEM AND OIL FEED CONTROL THEREFOR
Filed Aug. 11, 1930   2 Sheets-Sheet 2
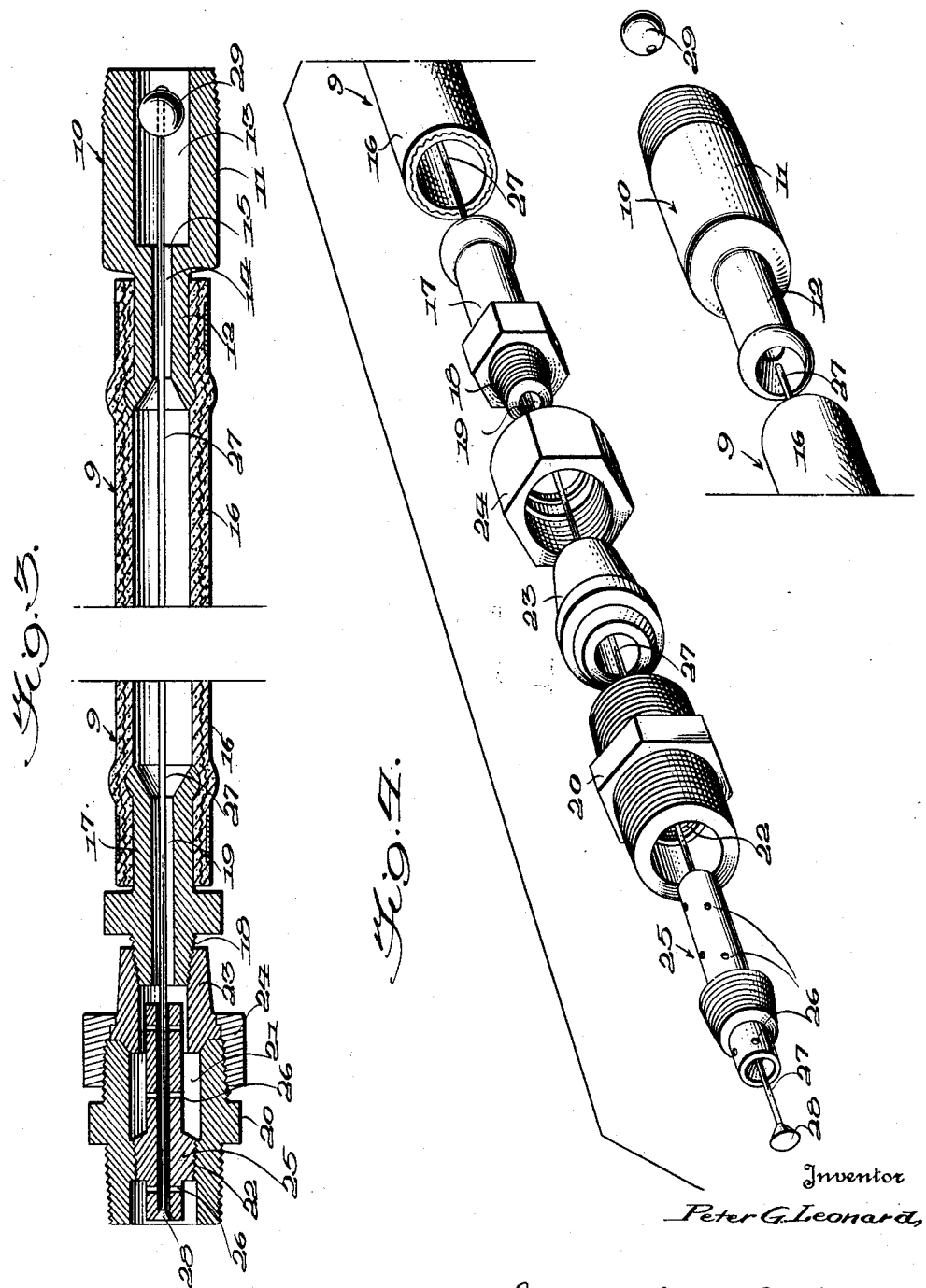

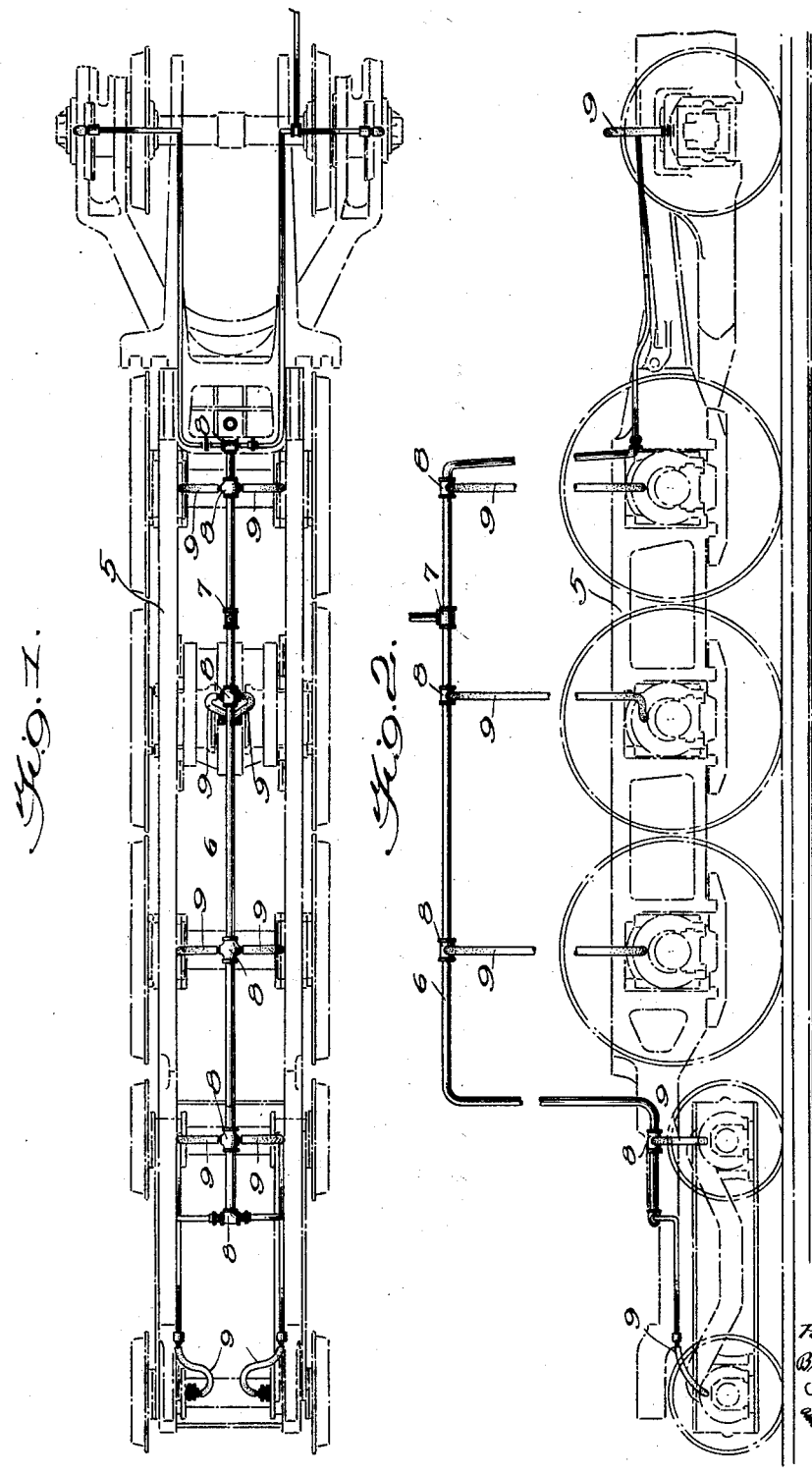

Patented Apr. 26, 1932

1,856,029

UNITED STATES PATENT OFFICE

PETER G. LEONARD, OF EL PASO, TEXAS

LUBRICATING SYSTEM AND OIL FEED CONTROL THEREFOR

Application filed August 11, 1930. Serial No. 474,526.

My invention relates to lubricating systems for the journals, guides, or other bearings of railroad locomotives or other rolling stock, and has particular reference to an oil feed device for effecting and controlling the flow of lubricant from the supply to each of the several parts or bearings to be lubricated.

It is an object of my invention to provide a centrally-located tank, reservoir or other supply for oil or other lubricant, a main line leading from said supply, and branch lines leading from said main line to each of the journals, guides or other bearings to be lubricated.

It is a further object of my invention to provide an oil feed device associated with each of the branch lines and located at or near each of the journals, guides or other bearings to be lubricated, said device including means for positively feeding the lubricant to the bearing when the locomotive or other rolling stock is in motion and restricting the feed to the bearing when the locomotive or other rolling stock is stationary.

It is a further object of my invention to provide an oil feed device associated with each of the branch lines and including means which, upon the breaking or disconnecting of the branch lines, becomes effective to positively cut off the flow of oil or other lubricant through said branch lines.

A still further object of my invention is to provide a lubricating system and oil feed control therefor which is simple in construction, cheap and easy to manufacture and assemble, strong and durable and highly efficient for the purposes for which designed.

In the accompanying drawings, wherein I have shown a preferred embodiment of my invention, Fig. 1 is a diagrammatic plan view of a portion of the frame or understructure of a locomotive or other type of railroad rolling stock, showing my improved lubricating system applied thereto, Fig. 2 is a side elevation of the diagrammatic showing of Fig. 1, Fig. 3 is a sectional view of one of the oil feed control devices and the branch line leading from the main line to the journal, guide or other bearing to be lubricated, and, Fig. 4 is a disassembled view of the device shown in Fig. 3.

Referring to the drawings, wherein like reference numerals are employed to designate like parts throughout the several views, the numeral 5 designates a diagrammatic showing of the frame or understructure of any desired or preferred type of railroad rolling stock, it being understood that my invention to be hereinafter described is applicable to the lubrication of the journals, shoes and wedges, hubs, guides, or other bearings of steam, gas and/or electric locomotives and equipment, tenders, cars, or the like. At a suitable position on the locomotive or other rolling stock, a tank or reservoir is mounted, and this tank or reservoir (not shown) is connected to a horizontally-extending main supply line 6, through a T-type pipe connection 7. Additional T-type connections 8 are provided throughout the length of the main supply line 6, and from these T-type connections 8, branch lines 9 extend to each of the journals or other bearings to be lubricated. The tank or reservoir for the lubricant may be mounted a sufficient distance above the main supply pipe 6 to effect a gravity flow of the lubricant from the said tank or reservoir through the main supply line 6 and branch lines 9, or a sufficient head of air pressure may be maintained on the body of lubricant within the tank or reservoir to effect the flow of the lubricant from the tank through the main and branch lines.

Each branch line 9 includes a pipe connection 10 having an externally-threaded body portion 11 and a reduced headed portion 12, this pipe connection 10 being axially bored to provide an enlarged passage 13 within the body portion 11 and a smaller passage 14 within the reduced headed portion 12, these two passages 13 and 14 being axially alined and communicating and providing a valve seat 15 for a purpose to be hereinafter described. The externally-threaded end of the pipe connection 10 is screwed into the T-type connection 8, and a flexible metallic hose 16 is fitted over and clamped to the reduced headed portion 12 of the fitting, thus providing the connection between the main line 6 and the branch line.

Each flexible metallic hose 16 constitutes a branch line 9 connected to the main line 6 in the manner above described, and at the lower end of each branch line 9, the hose 16 is fitted over and clamped to the reduced head of a hose connection 17, whose outer end 18 is tapered and externally threaded, the entire connection 17 being axially bored to provide a continuous passage 19.

At each of the journals or bearings to be lubricated, I provide a box or journal fitting 20, externally threaded at its opposite ends and being internally bored to provide an enlarged passage or chamber 21, intermediate of which I provide a reduced, internally-threaded portion 22. The hose connection 17 is coupled to the fitting 20 through the instrumentality of a union 23 having its outer end internally threaded to engage the tapered, externally-threaded end 18 of the hose connection 17, and having a shouldered inner end engaged by an internally-threaded sleeve 24 which screws on to the externally-threaded end of the fitting 20, whereby to provide a tight-leak-proof connection between the hose connection 17 and the fitting 20.

Within each of the fittings 20, I provide a removable and interchangeable plug member 25, having an enlarged, externally-threaded portion intermediate its ends which engages the reduced, internally-threaded portion 22 of the fitting 20 and separates or divides the enlarged passage or chamber 21. The plug member 25 is axially bored throughout its length, and each end on opposite sides of the enlarged externally-threaded portion, is provided with a plurality of radially disposed passages 26, which extend from the surface of the plug member to the inner axial passage thereof.

After the parts have been assembled and rigidly connected as above described and as clearly shown in Fig. 3, to form a branch line between the main line 6 and the journal or bearing to be lubricated, I next thread through the several alined passages in the connections and fittings and through the hose 16, a flexible wire 27 of steel or other material, the overall length of this wire being slightly greater than the distance between the valve seat 15 in the pipe connection 10 and the inner end of the plug 25. This wire 27 is free to move axially within the elements comprising the branch line, and is restricted in its movement by means of an enlarged head 28 formed on the inner or bearing-fitting end of the wire, and a ball 29 secured at the outer or pipe connection end of said wire, all as clearly shown in Fig. 3. The diameter of the wire 27 is considerably less than the diameter of the passages 14 and 19, and it is apparent that the relationship or relative diameter of the wire with respect to the diameter of the passage in the plug 25 determines the rate of flow of the oil through said passage to the journal or bearing to be lubricated. By varying the diameter of the wire and/or the diameter of the passage in the removable and interchangeable plug 25, various feeds can be obtained, depending on the amount of lubricant required at the particular bearing or the viscosity of the lubricant being supplied.

Having thus described my invention and referring now to the operation of the preferred embodiment thereof, it will be seen that the lubricant either flows by gravity or under slight pressure from the tank or receptacle, through the T-type fitting 7, through the main line 6, through the T-type fittings 8, normally through the pipe connection 10, through the pipe connection 17 and into the chamber 21. When the locomotive or other rolling stock to which the system and oil feed control is applied is in motion, the up and down or other movements of the journals or other bearings due to vibration caused by track depressions and swinging motions, causes an axial movement of the wire 27 within the branch line and its associated parts. This reciprocation and vibration of the wire within the passage in the plug 25 very materially assists in the feed of the lubricant from the chamber 21 in the fitting 20, through the radially-disposed passages 26 into the passage within the plug 25, through the passage within the plug 25, and through the radially-disposed and axially-disposed passages in the inner end of the plug member, from whence the lubricant passes to the bearing, it being noted that at no time, under normal operating conditions, will the ball 29 rest upon the seat 15 and hence there is normally a free and unobstructed flow of the lubricant from the main line 6 through the branch line to the chamber 21. In the event of a break in the flexible hose 16, the distance existing between the end 28 of the wire 27 and the valve seat 15 will be increased and the ball valve 29 will be forced on the valve seat 15, thus positively cutting off the flow of oil through the defective branch line and preventing the waste of lubricant. When the locomotive or other rolling stock to which the system and oil feed control is applied is stationary, the presence of the wire within the passage in the plug 25 will act somewhat as a choke and the amount of lubricant passing through the fitting to the bearing will be very materially reduced. Hence, when the locomotive or other rolling stock is in motion, maximum lubrication is effected, but when the locomotive or other rolling stock is stationary, only a negligible amount of lubricant is supplied. As stated, the amount of lubricant fed to the bearing can be readily controlled by varying the relationship and/or relative size of the wire 27 with respect to the size of the passage in the plug 25. It is also possible with my construction to so adjust the length of the wire 27 between the enlarged end 28 and the ball valve 29, that when the locomotive or other rolling stock is stationary, the ball valve 29 will rest on its seat 15, and hence, no lubricant will be supplied to the chamber 21 when the locomotive or other rolling stock is not in motion. This can be readily accomplished by decreasing the length of that portion of the wire extending between the valve seat 15 and the ball valve 29 so that the vibration of the wire 27 alternately seats and unseats the ball valve 29 on its seat 15. Obviously, in this arrangement, when the locomotive or other rolling stock is not in motion, the ball will rest on its seat and, hence, no lubricant will be supplied.

It will be understood that the form of my invention herein shown and described is to be taken as a preferred embodiment of the same and that numerous changes may be made in the shape, size and arrangement of parts without departing from the spirit of my invention or the scope of the subjoined claims.

Having thus described my invention, I claim:—

1. A lubricating system for the journals or bearings of locomotives or other railroad rolling stock comprising a supply of lubricant, a branch line from said supply to the journal or bearing to be lubricated, said branch line having a valve seat therein, and a wire extending through said branch line having the lower end secured therein and having a valve at its upper end, said wire normally holding the valve off the seat to permit the flow of lubricant therethrough but forcing said valve upon the seat to automatically cut off the flow of lubricant therethrough upon the breaking of the branch line between the journal or bearing and the valve seat.

2. A lubricating system for the journals or other bearings of locomotives or other railroad rolling stock comprising a supply of lubricant, branch lines leading from said supply to the journals or bearings to be lubricated, each of said branch lines comprising a pipe connection for attaching the branch line to the supply, said pipe connection including a valve seat therein, a fitting attached to the journal or bearing to be lubricated and having a passage therethrough, a flexible hose connecting the pipe connection and fitting, a wire extending through the passage in said fitting, hose and pipe connection and having an enlarged head at its lower end to prevent movement of said wire through said passage, and a valve secured to the upper end of said wire within the pipe connection, said wire normally holding the valve off the seat to permit the flow of lubricant through the pipe connection, but forcing said valve upon its seat to cut off the flow of lubricant through the branch line upon the breaking of said branch line.

3. A lubricating system for the journals or other bearings of locomotives or other railroad rolling stock comprising a supply of lubricant, a main line leading from said supply, branch lines leading from said main line to each of the journals or bearings to be lubricated, a normally-open valve seat in each branch line permitting the normal flow of lubricant through said branch line, a wire associated with said branch line and having an overall length slightly greater than the distance between the journal or bearing and the said valve seat, and a valve controlled by the wire and adapted to be moved to the valve seat to stop the flow of lubricant therethrough upon the breaking of the branch line.

4. A lubricating system for the journals or other bearings of locomotives or other railroad rolling stock comprising a supply of lubricant, branch lines leading from said supply to each of the journals or bearings to be lubricated, a normally-open valve seat in each branch line, a wire extending axially throughout the length of the branch line and having an overall length slightly greater than the distance between the journal or bearing and said valve seat, and a valve carried by said wire normally held off the said valve seat to permit the normal flow of lubricant through the branch line, said wire moving the valve upon the seat to cut off the flow of lubricant through the branch line upon the breaking of said branch line.

5. A lubricating system for the journals or other bearings of locomotives or other railroad rolling stock comprising a supply of lubricant, branch lines leading from said supply to each of the journals or bearings to be lubricated, each of said branch lines comprising a pipe connection for attaching the branch line to the supply, said pipe connection including a valve seat therein, a fitting attached to the journal or bearing to be lubricated, a flexible hose connecting the pipe connection and fitting, a wire extending through said pipe connection, hose and fitting and having an overall length slightly greater than the distance between the journal or bearing and said valve seat, and a valve secured to the end of said wire and positioned within the pipe connection, said wire normally holding the valve off the seat to permit the flow of lubricant through the pipe connection, but forcing said valve upon the seat within the pipe connection to automatically cut off the flow of lubricant through the pipe connection, hose and fitting upon the breaking of said hose.

6. A lubricating system for the journals or other bearings of locomotives or other railroad rolling stock comprising a supply of lubricant, branch lines leading from said supply to each of the journals or bearings to be lubricated, a fitting at the journal or bearing end of said branch line including a passage, and a wire extending through the passage in said fitting and freely reciprocable therein when the locomotive or other rolling stock is in motion to assist the flow of lubricant through said passage to the journal or bearing to be lubricated.

7. A lubricating system for the journals or other bearings of locomotives or other railroad rolling stock comprising a supply of lubricant, branch lines leading from said supply to each of the journals or bearings to be lubricated, a fitting at the journal or bearing end of said branch line including an internal chamber, a plug within said chamber and including an axially extending passage, and a wire extending through the passage in said plug and freely reciprocable therein when the locomotive or other rolling stock is in motion to assist the flow of lubricant from said internal chamber, through the passage in the plug to the journal or bearing to be lubricated.

8. A lubricating system for the journals or other bearings of locomotives or other railroad rolling stock comprising a supply of lubricant, branch lines leading from said supply to each of the journals or bearings to be lubricated, a fitting at the journal or bearing end of said branch line including an internal chamber, a plug within said chamber including an axially-extending passage and radial passages communicating with said axially-extending passage, and a wire extending through the axial passage in said plug and freely reciprocable therein when the locomotive or other rolling stock is in motion to assist the flow of lubricant from said internal chamber, through the radial and axial passages in the plug to the journal or bearing to be lubricated.

9. A lubricating system for the journals or other bearings of locomotives or other railroad rolling stock comprising a supply of lubricant, branch lines leading from said supply to each of the journals or bearings to be lubricated, a fitting at the journal or bearing end of said branch-line including an internal chamber, a plug within said fitting including an enlarged intermediate portion dividing said internal chamber and having an axial passage through the length of said plug extending from one portion of said chamber to the other, and a wire extending through the passage in said plug and freely reciprocable therein when the locomotive or other rolling stock is in motion to assist the flow of lubricant through the passage in the plug to the journal or bearing to be lubricated.

10. A lubricating system for the journal or other bearings of locomotives or other railroad rolling stock comprising a supply of lubricant, branch lines leading from said supply to each of the journals or bearings to be lubricated, a fitting at the journal or bearing end of said branch line including an internal chamber, a removable plug within said fitting including an intermediate partition portion for dividing said chamber into an inner and outer portion and an axial passage through the length of said plug extending through the partition and communicating with each portion of the chamber, and a wire extending through the passage in said plug and freely reciprocable therein when the locomotive or other rolling stock is in motion to assist the flow of lubricant through the passage from the outer to the inner portion of said internal chamber and to the journal or bearing to be lubricated.

In testimony whereof I hereunto affix my signature.

PETER G. LEONARD.